United States Patent
Jones

(10) Patent No.: US 6,609,643 B1
(45) Date of Patent: *Aug. 26, 2003

(54) DUAL CLAMPING ARRANGEMENT FOR CONNECTING ROD FRACTURING MACHINE

(75) Inventor: Joel W. Jones, Windsor (CA)

(73) Assignee: Tri-Way Machine Tool Ltd., Windsor (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,008

(22) Filed: May 6, 1997

(51) Int. Cl.[7] ............... B26F 3/00; B23P 17/02
(52) U.S. Cl. ............... 225/2; 225/96; 225/101; 225/105; 29/888.09
(58) Field of Search ............... 225/2, 96.5, 95, 225/100, 101, 103, 105; 29/888.09

(56) References Cited

U.S. PATENT DOCUMENTS

| 4,445,602 A | 5/1984 | Chana .................... 192/53 |
| 4,569,109 A | 2/1986 | Fetouh .................... 29/156 |
| 4,684,267 A | 8/1987 | Fetouh .................... 384/294 |
| 4,768,694 A | 9/1988 | Fabris et al. ............. 225/94 |
| 4,860,419 A | 8/1989 | Hekman ................... 29/156.5 |
| 4,970,783 A | 11/1990 | Olaniran et al. .......... 29/888.09 |
| 4,993,134 A | 2/1991 | Hoag et al. .............. 29/888.092 |
| 5,105,538 A | * 4/1992 | Hoag et al. .............. 29/888.09 |
| 5,115,564 A | 5/1992 | Miessen et al. .......... 29/888.09 |
| 5,263,622 A | * 11/1993 | Henzler et al. .......... 225/100 X |
| 5,283,938 A | * 2/1994 | Jones .................... 29/888.09 X |
| 5,320,265 A | * 6/1994 | Becker ................... 29/888.09 X |
| 5,503,317 A | 4/1996 | Jones et al. ............. 225/103 |
| 5,699,947 A | * 12/1997 | Cavallo et al. ........... 225/101 |

FOREIGN PATENT DOCUMENTS

| DE | 9210167 | 7/1992 | | |
| EP | 0467198 | 5/1994 | | |
| EP | 0661125 | 7/1995 | | |
| JP | 405261626 | * 10/1993 | ........ | 29/888.09 |
| JP | 405277843 | * 10/1993 | ........ | 29/888.09 |

* cited by examiner

*Primary Examiner*—Charles Goodman
(74) *Attorney, Agent, or Firm*—Carlson, Gaskey & Olds

(57) ABSTRACT

An improved fracturing machine for fracturing a connecting rod preform includes clamping mechanisms at both upper and lower portions of the preform. Wedges lock the clamps onto the preform during fracturing. The top and bottom clamps provide a cleaner fracture at the fracture plane. The bottom clamp preferably includes rear and forward members which may move along an arc-shaped interface to allow adjustment of the clamping contact position. The top clamp preferably includes rear and forward clamp portions which are spaced slightly such that the forward clamp can twist slightly to accommodate the shape of the individual preform.

9 Claims, 3 Drawing Sheets

DUAL CLAMPING ARRANGEMENT FOR CONNECTING ROD FRACTURING MACHINE

BACKGROUND OF THE INVENTION

Vehicle camshaft connecting rods are utilized to connect a camshaft to a piston. Typically, a rod has an attachment portion at one end which is attached to the piston. The other end of the rod leads to two separable bolted portions which are positioned on the crankshaft and then bolted together.

It is desirable that the connection surfaces between the two bolted portions match as closely as possible. To achieve this goal, known systems use a connecting rod preform. The two bolted portions are initially formed integrally with a fracture plane formed between the bolted portions as a preform. This preform is placed on a connecting rod fracturing machine.

In known connecting rod fracturing machines, the preform is placed on a split mandrel, with the mandrel received in a central opening of the connecting rod. A ram is driven to force opposed mandrel portions away from each other, and crack the preform along the fracture plane. When the preform cracks along the fracture plane, the two bolted portions have opposed surfaces which should interfit very closely.

There is a good deal of effort made in the field of connecting rod fracturing machines to ensure that the fracture of the preform occurs as cleanly through the fracture plane as possible.

In one known system disclosed in U.S. Pat. No. 5,503,317, a hold down structure is forced by a wedge lock onto bolt shoulders on the top of the preform. The bottom of the preform sits on a fixed base. This structure locks the preform during fracturing. While this system is a great improvement upon the prior art, it would still be desirable to improve upon this known system.

SUMMARY OF THE INVENTION

In a disclosed embodiment of this invention, a machine for fracturing connecting rods has clamps which lock both bottom and top portions of the connecting rod preform. In a preferred embodiment, once the preform is mounted onto the mandrel, wedges are driven through angled grooves to force and lock the clamps onto the top and bottom portions of the preform. In a preferred embodiment, both the top and bottom clamps provide opposed hold down portions on each side of the preform that move as a single unit.

In the preferred embodiment, both top and bottom clamps are formed of two portions to allow adjustment. In a preferred embodiment the top clamp includes a rear portion which has the groove for being actuated by the wedge. A front portion of the top clamp includes the hold down elements. A small spacer is placed between the rear and forward portions, and the two portions are bolted to each other through the spacer. Thus, there is a small gap between the two portions. As the forward portion of the top clamp is brought into contact with the bolt shoulders of the preform, the small space allows the forward portion to rock slightly relative to the rear portion to adjust for any manufacturing tolerances between the two bolt shoulders. Thus, the top clamp is adjustable to accommodate the shape of the particular preform.

In a preferred embodiment, the bottom clamp includes forward and rear portions which are connected along an arc, such that the forward and rear portion can rock relative to each other along the arc. An arc-shaped interconnection finger is formed on both the rear and forward bottom clamp. The rear bottom clamp portion is formed with the angled groove, and the wedge moves through the groove to force the rear portion toward the preform shoulders. The rear portion drives the forward portion against the preform shoulders. The interfitting fingers of the rear and forward portions allow relative movement of the two portions along the arc-shaped interconnection to accommodate the shape of the individual preform. However, once the forward member is in contact with the preform, the wedge lock ensures that it is locked securely, and will not move during preform fracture.

In further features of this invention, two adjustable contact members provide the actual contact between the bottom clamp and the preform. The contact members have a cylindrical portion received in a hole in the forward portion. The portion of the contact member which contacts the preform is preferably polygonal, and can adjust to a straight surface on the preform. The contact member adjusts to accommodate the particular shape of the preform, and will turn within the cylindrical hole. The contact member and the arc-shaped interconnection ensure that the lower clamp does adjust to conform to the shape of the particular preform being fractured.

These and other features of the present invention can be best understood from the following specification and drawings, of which the following is a brief description.

DETAILED DESCRIPTION OF A PREFERRED EMBODIMENT

Figure 1A:
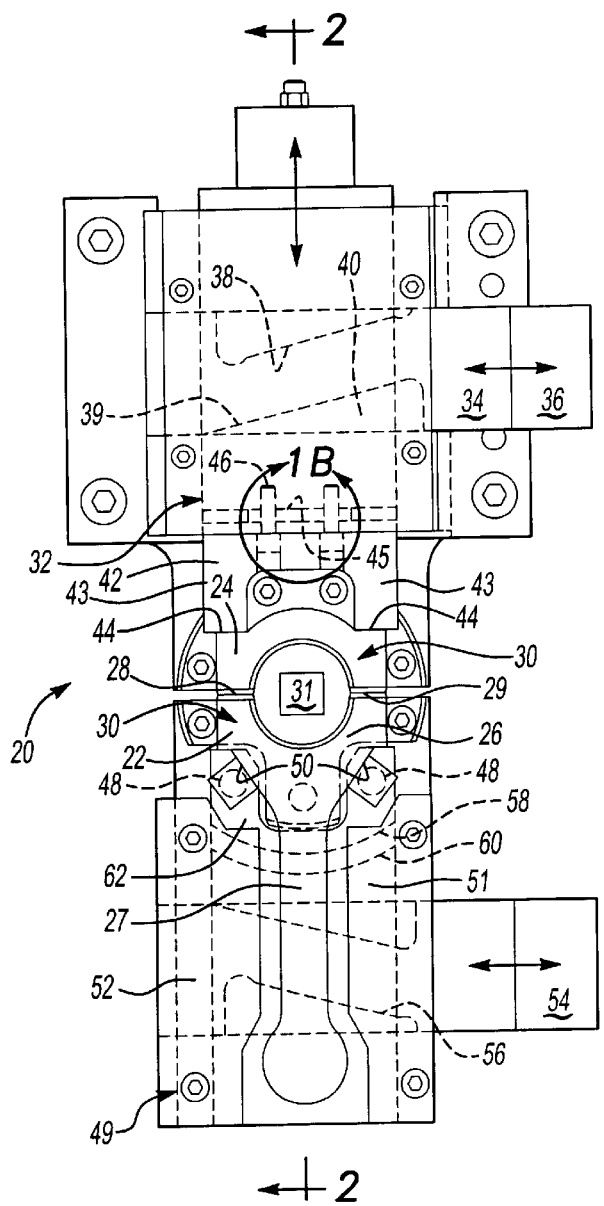
FIG. 1A is a front view of an inventive connecting rod fracturing machine.

FIG. 1A shows a fixture 20 for fracturing a connecting rod preform 21 having lower and upper bolt parts or portions 22 and 24. Lower bolt portion 22 merges into a body 26 leading to a piston connection portion 27. A fracture plane 28 is formed in the preform between the upper and lower bolt portions 24 and 22.

As shown in the drawings, a pair of mandrel halves 30 are separable across a parting plane 29 coplanar with fracture plane 28. The mandrel halves 30 are forced away from each other by a ram 31 in a fracture direction A perpendicular to the parting plane 29 and fracture plane 28. The mandrel halves 30 force the upper and lower bolt portions 24 and 22 away from each other such that the preform fractures at plane 28 (FIGS. 3B and 4).

The present invention improves clamping and support of the preform during fracturing. A first top or upper clamp device 32 is positioned above upper bolt portion 24. Upper clamp device includes a wedge 34 movable to the left and right in FIG. 1A by an actuator 36. Actuator 36 may be a piston and cylinder combination, or any other drive structure. A ramp 38 extends between ends of the wedge 34, and through a ramped channel 39 in rear upper clamp portion or sliding member 40. When wedge 34 is driven to the left from the position shown in this figure, ramp 38 forces rear portion 40 downwardly in the direction of arrow A. Forward top clamp portion 42 is fixed to rear portion 40. Forward portion 42 has two hold down portions 43 for engaging clamping portions or bolt shoulders 44 of the upper half 24 lying on laterally opposite sides of the mandrel 30.

Figure 1C:
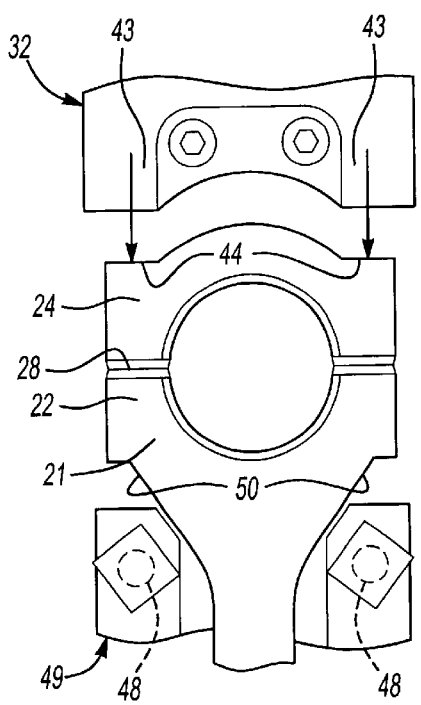
FIG. 1C shows movement of the clamping members to hold the connecting rod preform.
Figure 1B:
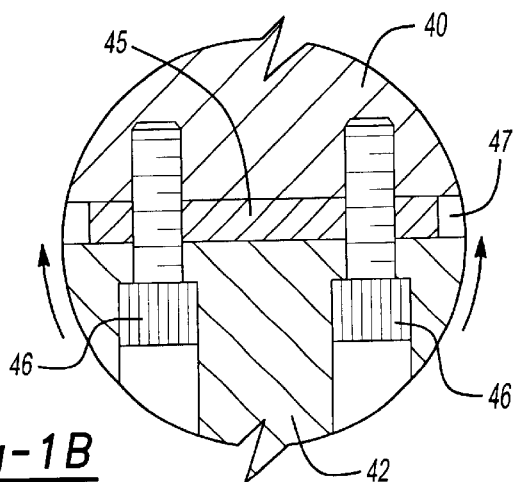
FIG. 1B is an enlarged portion of FIG. 1A around the circle identified by 1B.

As shown best in FIG. 1B, a thin shim 45 is positioned between rear portion 40 and forward portion 42. Rear portion 40 and forward portion 42 are attached with bolts 46 to each other and through shim 45. A space 47 on either side of the shim 45 between the rear 40 and forward 42 portions allows the forward portion 42 to twist or rock slightly away from a parallel position relative to rear portion 40. The width of shim 45 is exaggerated to better show this adjustment ability. This allows hold down portions 43 to move to conform to the position and shape of a preform 21 so as to fully engage and distribute the clamping load applied to the bolt shoulders 44 on clamp up.

A second lower or bottom clamp device 49 will now be described with reference to FIGS. 1A and 2. Clamping contact members 48 of the lower clamp device 49 contact clamping portions or angled side faces 50 of preform 21 lying on laterally opposite sides of the mandrel 30. Alternatively, the clamp can contact other surfaces on bolt portion 22 of preform 21. The contact members 48 are carried on forward bottom clamp portion 62 and are movable therewith. The bottom clamp 49 includes a rear clamp portion 51 receiving wedge 52. Actuator 54 drives wedge 52 from left to right as shown in FIG. 1A. Cam or ramp 55 of wedge 52 extends through a ramped channel or groove 56 in rear clamp portion 51 to cause the rear clamp portion 51 to slide in the direction of fracture A (FIG. 1A). The rear clamp portion 51 may also be referred to as the sliding member 51. Referring additionally to FIGS. 3A and 3B, an arc-shaped finger 58 of rear portion 51 mates with an arc-shaped finger 60 of a forward bottom clamp portion or carrier 62. Forward bottom clamp portion 62 carries contact members 48.

As shown best in FIG. 1C, the preform 21 is positioned on mandrels 30, with ram 31 initially withdrawn. The hold down portions 43 are then brought downwardly against the shoulders 44 of bolt portion and contact members 48 are brought upwardly against the sides 50 of the bolt portion 22 of the preform through action of the wedges 34,52, respectfully.

Figure 2:
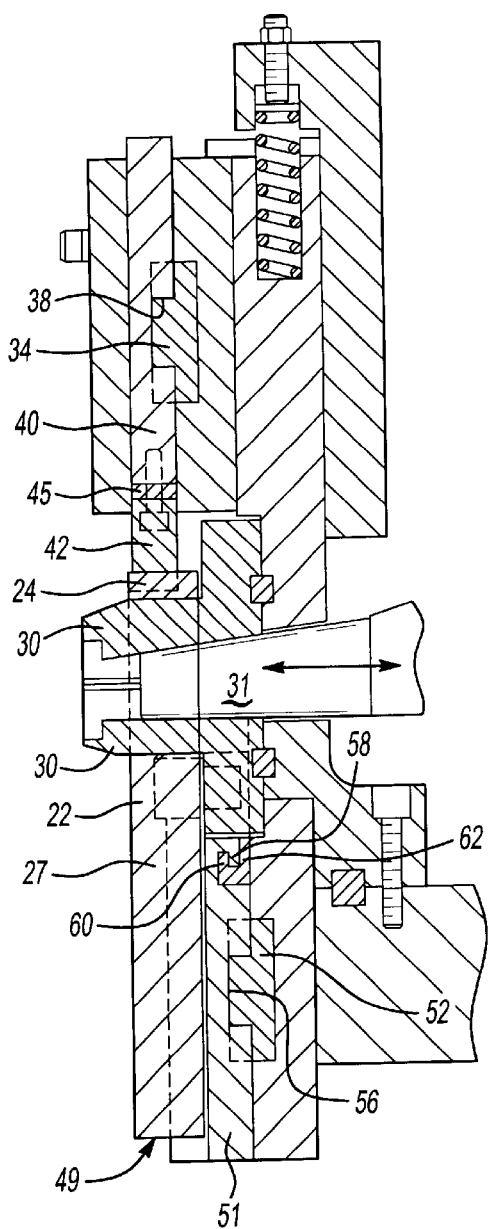
FIG. 2 is a cross-sectional view along line 2—2 of FIG. 1A.
Figure 3A:
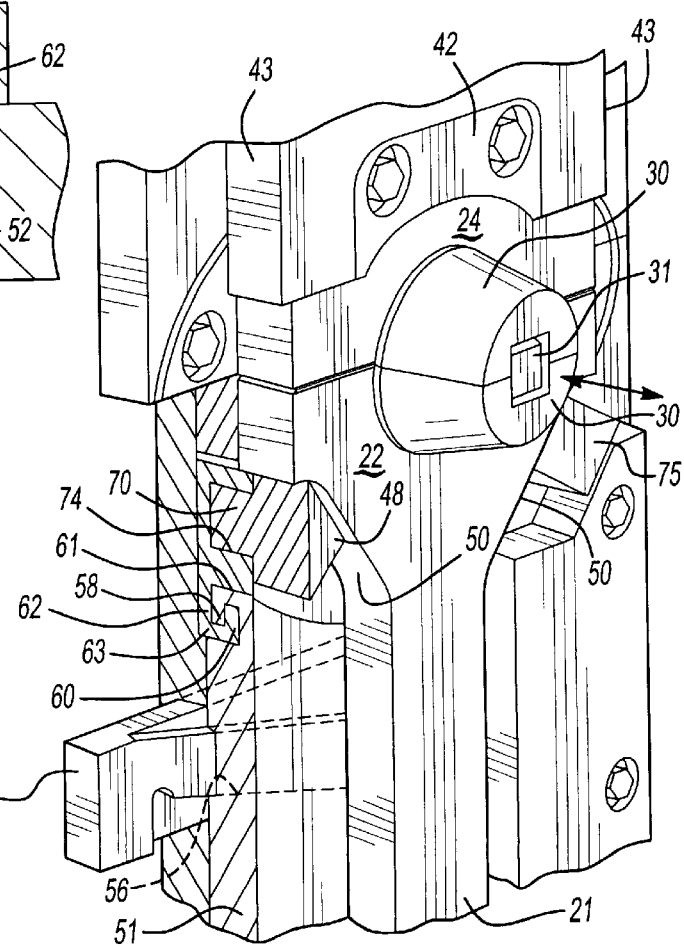
FIG. 3A shows a partially cutaway side view of the components in clamped position.
Figure 3B:
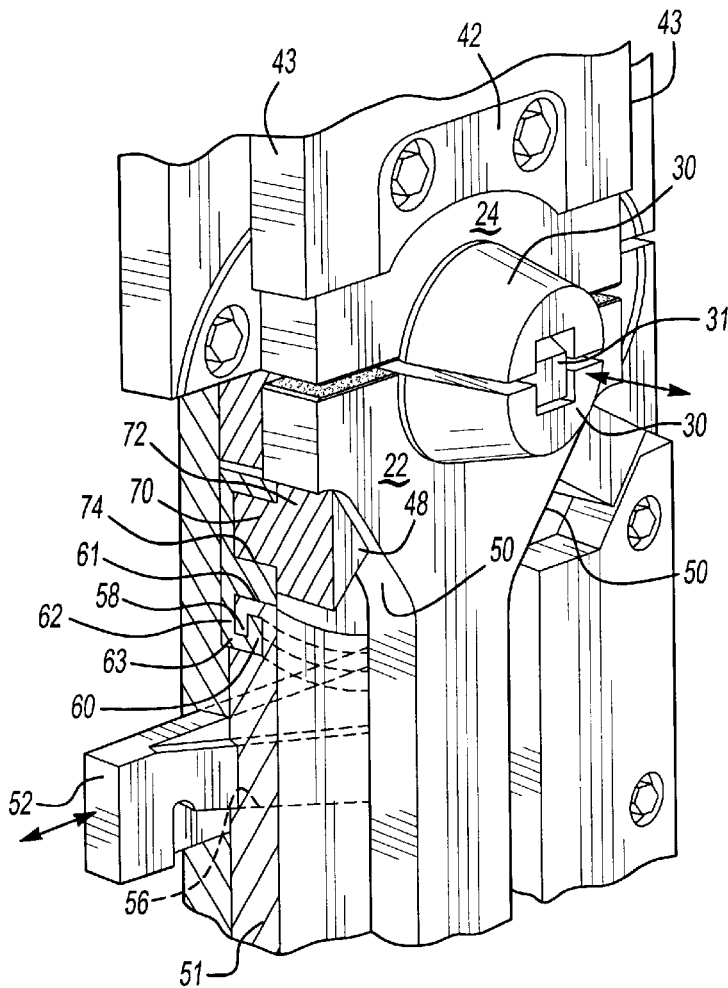
FIG. 3B shows a view similar to FIG. 3A, but with the preform fractured.
Figure 4:
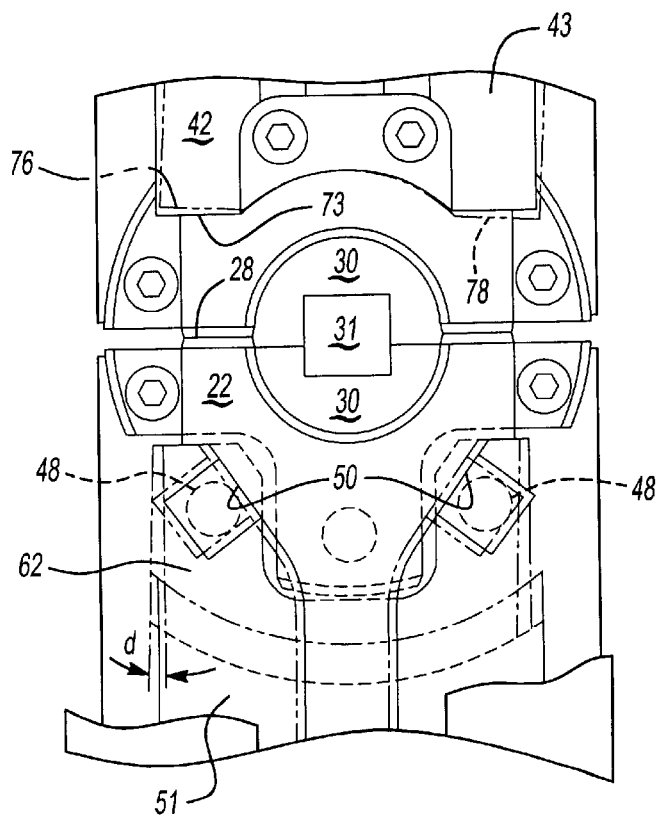
FIG. 4 shows a front view of the preform in a clamped orientation.

As can be seen in FIGS. 2 and 3A–3B, fingers 58 and 60 interfit relative to each other, and extend from base planar portions 61 and 63, respectively, and alongside each other. The interfitting fingers extending from the base plane ensure a secure mount and proper guidance for the forward bottom portion 62 for guided adjustment on the rear bottom portion 51.

As can be appreciated from FIG. 2, the wedges 52 and 34 interact with the ramped passages 39,56 to force the top and bottom clamp portions 42,62 to engage the preform, as explained above.

As shown in FIG. 3A, the interfitting fingers 60 and 58 provide guidance. As the contact members 48 approach the side faces 50 of the preform 21, the forward portion or carrier 62 may rock on the arc-shaped connection relative to the rear portion member 51 to allow contact members 48 which are carried by and move with the carrier 62 to adjust to accommodate the particular shape of the preform 21 so that both contact members 48 engage the side faces 50 equally.

As best seen in FIGS. 1C, 3A–3B and 4, the contact members 48 include a rear cylindrical hole 74 in the forward portion 62. Thus, the contact members 48 can further rotate about their cylindrical portions 70 to bring their clamping faces into alignment and full engagement with the side faces 50 of the preform 21. A polygonal forward end 75 of the members 48 thus move to match surface 50. The contact members 48 thus move independently of one another and independently of the rocking movement of the carrier 62 on which the contact members 48 are commonly carried for precise conformance with the preform 21.

FIG. 3B shows the same structure after fracture along plane 28 (see FIG. 4). After fracture the clamps move away from each other and the separated preform halves remain clamped or locked in position on their respective mandrels 30 via the above described wedge-lock clamping system.

FIG. 4 shows adjustment of the bottom clamp. As shown in solid line, forward portion 62 has rocked slightly clockwise from its original solid line position to the broken chain line position to accommodate the particular shape of the preform. In addition, the upper hold down portions 43 are also tilted slightly from their original solid line position, to adjusted broken chain line positions 76,78, again to accommodate the particular shape of the preform.

With the present invention, the preform is initially placed on the mandrels and the upper and lower portions of the preform. The mandrels are then driven outwardly by ram 31, and the preform cracks along the fracture plane 28. At that time, the clamp portions do move slightly away from each other, as is the case with the fracturing system disclosed in U.S. Pat. No. 5,503,317.

A preferred embodiment of the invention has been disclosed, however, a worker of ordinary skill in the art would recognize that certain modifications would come within the scope of this invention.

What is claimed is:

1. A method of fracturing a connecting rod preform across a fracture plane of a large end to separate the large end into an upper and lower part, said method comprising the steps of:

(1) mounting the preform onto a mandrel having upper and lower portions, (2) providing a top clamp including forward top and rearward top portions pivotally attached to each other with a space defined by a shim therebetween, said rearward top portion actuated by an actuator to drive said forward top portion into engagement with said preform, said forward top portion pivotal away from a parallel position relative to said rearward top portion to conform to said preform, (3) providing a bottom clamp including forward bottom and rear bottom portions, said forward bottom portion pivotal relative to said rear bottom portion and including at least two contact members mounted to said forward bottom portion and rotatable relative to said rear bottom portion for conforming to said preform; and (4) engaging said preform with said top and bottom clamps; and (5) forcing a first wedge member through a central bore defined between said upper and lower mandrel portions to force said mandrel portions apart and fracture the preform across the fracture plane.

2. The method of claim 1, further including bolting the forward top portion to the rearward top portion through said shim at two spaced apart locations, and said step (2) is further defined as sizing said shim to permit said forward top portion to rock about said shim relative to said rearward top portion under a clamping load.

3. The method of claim 2, wherein said rearward top portion includes a ramped channel for a top wedge moved within said ramped channel by said actuator, and said step (4) is further defined as moving said top wedge within said ramped channel to move said top clamp into engagement with said preform.

4. The method of claim 1, wherein said forward top portion includes hold down portions and said step (4) is further defined as twisting said forward top portion away from a parallel position relative to said rearward top portion to conform to said preform.

5. The method of claim 1, wherein said forward bottom and rearward bottom portions include an arc-shaped channel providing relative pivotal movement of said forward bottom portion relative to said rearward bottom portion, and said step (4) is further defined by sliding said forward bottom portion within said arc-shaped channel relative to said rearward bottom portion to conform with said preform.

6. The method of claim 5, wherein said rearward bottom portion includes a bottom ramped channel for a bottom wedge, said bottom wedge actuated by an actuator, and said step (4) is further defined as driving said bottom wedge into said bottom ramped channel to move said forward bottom portion into engagement with said preform.

7. The method of claim 1, wherein said step (4) is further defined by sliding said forward bottom portion within said arc-shaped channel relative to said rearward bottom portion to conform with said preform.

8. A method of fracturing a connecting rod preform across a fracture plane of a large end to separate the large end into an upper and lower part, said method comprising the steps of:

(1) mounting the preform onto a mandrel having upper and lower portions, (2) providing a top clamp including forward top and rearward top portions attached to each other by a pivotal attachment, said pivotal attachment including a space between said forward top and rearward top portions, said rearward top portion actuated by an actuator to drive said forward top portion into engagement with said preform, said forward top portion pivotal away from a parallel position relative to said rearward top portion to conform to said preform, (3) providing a bottom clamp including forward bottom and rear bottom portions, said forward bottom portion slidable within an arc-shaped channel of said rear bottom portion and including at least two contact members mounted to said forward bottom portion and rotatable relative to said rear bottom portion for conforming to said preform; and (4) engaging said preform with said top and bottom clamps; and (5) forcing a first wedge member through a central bore defined between said upper and lower mandrel portions to force said mandrel portions apart and fracture the preform across the fracture plane.

9. The method of claim 8, wherein said step (2) is further defined by providing a shim between said forward top portion and said rearward top portion for defining said space therebetween.

* * * * *